(12) United States Patent
Choi et al.

(10) Patent No.: US 11,726,688 B2
(45) Date of Patent: Aug. 15, 2023

(54) STORAGE SYSTEM MANAGING METADATA, HOST SYSTEM CONTROLLING STORAGE SYSTEM, AND STORAGE SYSTEM OPERATING METHOD

(71) Applicant: SAMSUNG ELECTRONICS CO., LTD., Suwon-si (KR)

(72) Inventors: Jaeyoon Choi, Seoul (KR); Seokhwan Kim, Seoul (KR); Suman Prakash Balakrishnan, Bangalore (IN); Dongjin Kim, Hwaseong-si (KR); Chansol Kim, Hwaseong-si (KR); Eunhee Rho, Seoul (KR); Hyejeong Jang, Hwaseong-si (KR); Walter Jun, Seoul (KR)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 16/834,779

(22) Filed: Mar. 30, 2020

(65) Prior Publication Data
US 2021/0103388 A1     Apr. 8, 2021

(30) Foreign Application Priority Data
Oct. 2, 2019  (KR) .................. 10-2019-0122654

(51) Int. Cl.
  *G06F 3/06*   (2006.01)
  *G06F 11/10*  (2006.01)
  *G06F 11/14*  (2006.01)

(52) U.S. Cl.
  CPC ............ *G06F 3/064* (2013.01); *G06F 3/0619* (2013.01); *G06F 3/0631* (2013.01);
  (Continued)

(58) Field of Classification Search
  CPC ...... G06F 3/064; G06F 3/0619; G06F 3/0631; G06F 11/1068; G06F 3/0653; G06F 11/1435; G06F 3/0679
  See application file for complete search history.

(56) References Cited

U.S. PATENT DOCUMENTS

| 7,009,896 B2 | 3/2006 | Yoon et al. |
| 8,009,469 B2 | 8/2011 | Roohparvar |
| (Continued) | | |

FOREIGN PATENT DOCUMENTS

KR      10-0982440      9/2010

OTHER PUBLICATIONS

European Patent Office Communication dated Nov. 19, 2020 In Corresponding European Application No. 20177167.2-1203.

*Primary Examiner* — David Yi
*Assistant Examiner* — Dustin B. Fulford
(74) *Attorney, Agent, or Firm* — Fish & Richardson P.C.

(57) ABSTRACT

A storage system communicates with a host system and includes a storage device including storage medium divided into a plurality of blocks including high reliability blocks and reserve blocks, and a controller. The controller provides the host system with block information identifying the high reliability blocks among the plurality of blocks, receives a block allocation request from the host system, wherein the block allocation request is defined with reference to the block information and identifies at least one high reliability block to be used to store metadata, and allocates at least one high reliability block to a meta region in response to the block allocation request. The controller includes a bad block manager that manages an allocation operation performed in response to the block allocation request, and a repair module that repairs an error in metadata stored in one of the high reliability blocks.

20 Claims, 13 Drawing Sheets

(52) U.S. Cl.
    CPC .......... *G06F 3/0653* (2013.01); *G06F 3/0679* (2013.01); *G06F 11/1068* (2013.01); *G06F 11/1435* (2013.01)

(56) References Cited

U.S. PATENT DOCUMENTS

| | | |
|---|---|---|
| 10,073,640 B1 | 9/2018 | Klein |
| 10,860,228 B1* | 12/2020 | Mulani ................ G06F 3/0634 |
| 2005/0286297 A1* | 12/2005 | Roohparvar ........ G06F 11/1068 |
| | | 365/185.03 |
| 2009/0259799 A1 | 10/2009 | Wong |
| 2013/0007564 A1* | 1/2013 | Bedeschi ............. G06F 3/0644 |
| | | 714/763 |
| 2013/0326284 A1* | 12/2013 | Losh .................. G06F 12/0246 |
| | | 714/47.2 |
| 2016/0070493 A1 | 3/2016 | Oh et al. |
| 2017/0123881 A1 | 5/2017 | Seo |
| 2018/0137048 A1 | 5/2018 | Hsu et al. |
| 2018/0307440 A1 | 10/2018 | Takeda et al. |

\* cited by examiner

STORAGE SYSTEM MANAGING METADATA, HOST SYSTEM CONTROLLING STORAGE SYSTEM, AND STORAGE SYSTEM OPERATING METHOD

CROSS-REFERENCE TO RELATED APPLICATION

This application claims the benefit of Korean Patent Application No. 10-2019-0122654, filed on Oct. 2, 2019 in the Korean Intellectual Property Office, the subject matter of which is hereby incorporated by reference.

BACKGROUND

The inventive concept relates to storage systems, and more particularly to storage systems capable of effectively managing metadata. The inventive concept also relates to host systems controlling this type of storage system, as well as storage system operating methods.

The solid state drive (SSD) is one example of storage systems based on semiconductor memory devices, such as flash memory. A variety of interfaces has been used to access storage systems like the SSD (e.g., the serial-advanced technology attachment (SATA), peripheral component interconnection (PCI) express (PCIe), and serial attached small computer system interface (SCSI) (SAS), non-volatile memory express (NVMe), etc.).

Open-channel SSDs (OC-SSD) have more recently been proposed. In open-channel SSDs, various functions such as an address conversion operation once performed in an SSD are performed in a host system. As a result, the host system includes the flash translation layer (FTL) once administered by the SSD. Accordingly, the host system may directly perform various management operations based on the FTL. However, the host system may have difficulty determining one or more block characteristic(s) for the storage system until receiving information regarding bad block(s). Such bad block information may be communicated via a separate command, and due to this, since the host system has to manage significant information such as metadata without accurately knowing block characteristic(s), it may be difficult to maintain data reliability.

SUMMARY

The inventive concept provides a storage system, a host system, and an operating method for the storage system which efficiently manages metadata to enhance reliability of the metadata.

According to an aspect of the inventive concept, there is provided a storage system communicating with a host system, the storage system including; a storage device including storage medium divided into a plurality of blocks including high reliability blocks and reserve blocks, and a controller. The controller provides the host system with block information identifying the high reliability blocks among the plurality of blocks, receives a block allocation request from the host system, wherein the block allocation request is defined with reference to the block information and identifies at least one high reliability block to be used to store metadata, and allocates at least one high reliability block to a meta region in response to the block allocation request. The controller includes a bad block manager that manages an allocation operation performed in response to the block allocation request, and a repair module that repairs an error in metadata stored in one of the high reliability blocks.

According to another aspect of the inventive concept, there is provided an operating method of a storage system including a plurality of blocks. The operating method includes; receiving from a host system, a block allocation request identifying high reliability blocks among the plurality of blocks to be used to store metadata, allocating at the high reliability blocks and at least one corresponding reserve blocks to a meta region in response to the block allocation request, writing the metadata in the high reliability blocks in response to a metadata writing request from the host system, writing in the at least one corresponding reserve blocks, repair information for repairing an error in the metadata written in the high reliability blocks, determining whether one of the high reliability blocks is a bad block, and communicating to the host system, one of metadata read from the high reliability blocks and error-repaired metadata generated using the repair parity information.

According to another aspect of the inventive concept, there is provided a host system communicating with a storage system including a plurality of blocks. The host system includes; a host flash translation layer (FTL) used in performance of a management operation on the plurality of blocks, the host FTL including a request generating module that generates a block allocation request for allocating high reliability blocks among the plurality of blocks to be used to store metadata, and an interface circuit that interfaces with the storage system to receive block information identifying the high reliability blocks, and communicate a block allocation request to the storage system, wherein the block allocation request comprises information identifying a number and corresponding locations of the high reliability blocks to be used to store metadata.

BRIEF DESCRIPTION OF THE DRAWINGS

Embodiments of the inventive concept will be more clearly understood from the following detailed description taken in conjunction with the accompanying drawings in which.

DETAILED DESCRIPTION

Hereinafter, embodiments of the inventive concept will be described in some additional detail with reference to the accompanying drawings.

Figure 1:
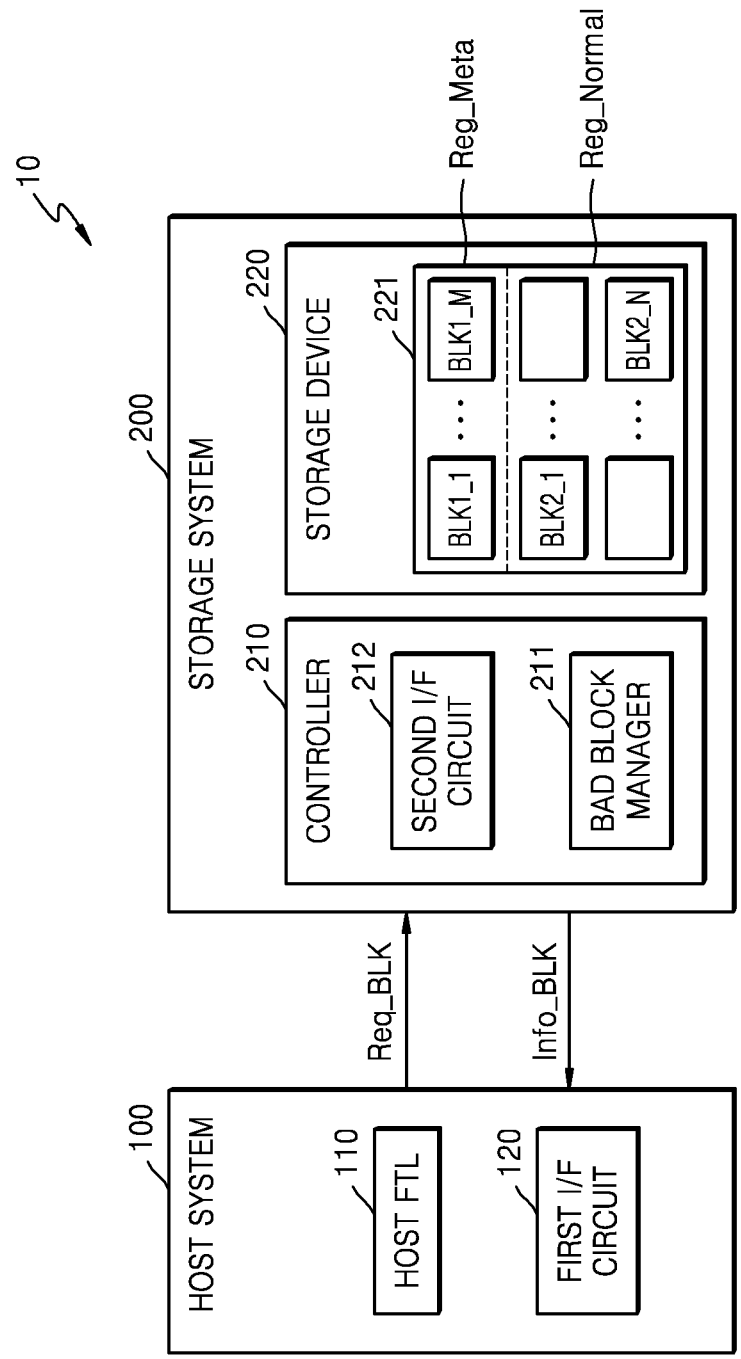
FIG. 1 is a block diagram illustrating a data processing system according to an embodiment.

Figure (FIG. 1 is a block diagram illustrating a data processing system 10 according to an embodiment.

Referring to FIG. 1, the data processing system 10 may include a host system 100 and a storage system 200, where the storage system 200 may include a controller 210 and a storage device 220. The host system 100 may provide the storage system 200 with a request(s) for read, write, and/or erase operations. And in response to such request(s) received from the host system 100, the storage system 200 may perform a read operation, a write operation, and/or an erase operation on data designated by one or more address(es) associated with the request(s).

The storage system 200 may include a plurality of storage mediums configured to store data in response to a request received from the host system 100. For example, the storage system 200 may include one or more solid state drives (SSDs). When the storage system 200 includes an SSD, the storage device 220 may include a plurality of flash memory chips (e.g., NAND flash memory chips) which respectively configured to non-volatilely store data. Alternatively, the storage device 220 may correspond to one flash memory device, or the storage device 200 may include a memory card including one or more flash memory chips.

When the storage system 200 includes a flash memory, the flash memory may include a two-dimensional (2D) NAND memory array or a three-dimensional (3D) (or vertical) NAND (VNAND) memory array. The 3D memory array may be a circuit that includes an active area disposed on a silicon substrate and is associated with an operation of each of memory cells, and may be configured in a monolithic type on a physical level of at least one of memory cell arrays each including a circuit which is provided on or in the substrate. The monolithic type may denote that layers of levels configuring the array are stacked directly on layers of lower levels of the array.

In an embodiment, the 3D memory array may include a plurality of vertical NAND strings which are arranged in a vertical direction in order for at least one memory cell to be disposed on another memory cell. The at least one memory cell may include a charge trap layer.

In this regard, U.S. Pat. Nos. 7,679,133, 8,553,466, 8,654,587 and 8,559,235 as well as U.S. Patent Application No. 2011/0233648 disclose appropriate elements related to certain 3D memory cell array(s) including a plurality of levels and in which word lines and/or bit lines are shared between the plurality of levels. The collective subject matter of these documents is hereby incorporated by reference.

As another example, the storage system 200 may include various kinds of memories. For example, the storage system 200 may include a non-volatile memory, where examples of the non-volatile memory may include, (e.g.) magnetic random access memory (RAM) (MRAM), spin-transfer torque MRAM, conductive bridging RAM (CBRAM), ferroelectric RAM (FeRAM), phase RAM (PRAM), resistive RAM (ReRAM), nanotube RAM, polymer RAM (PoRAM), nano floating gate memory (NFGM), holographic memory, molecular electronics memory, and insulator resistance change memory.

The host system 100 may communicate with the storage system 200 using one or more interfaces. According to an embodiment, the host system 100 may communicate with the storage system 200 via one or more interfaces, such as the universal serial bus (USB), multimedia card (MMC), peripheral component interconnection (PCI) express (PIC-E), advanced technology attachment (ATA), serial-ATA (SATA), parallel ATA (PATA), small computer system interface (SCSI), serial attached SCSI (SAS), enhanced small disk interface (ESDI), and integrated drive electronics (IDE). In this regard, a non-volatile memory express (NVMe) interface has been proposed as an interface optimized for the storage system 200 such as an SSD, and NVMe may be applied to the data processing system 10 according to an embodiment.

As an implementation example of the storage system 200, the storage system 200 may include an open-channel SSD (hereafter, "OC-SSD"). In an OC-SSD environment, a flash translation layer (FTL) 110 may be included in the host system 100, and thus, various kinds of management operations corresponding to the storage system 200 may be performed under the control of the host system 100. For example, the host system 100 may perform an address conversion operation between a logical address (LA) recognized by the host system and a corresponding physical address (PA) recognized by the storage system 200. Thus, the host system 100 may provide physical address(es) to the storage system 200, where such address(es) may be used to directly index or identify data associated with a host system request.

According to the embodiment illustrated in FIG. 1, the host system 100 may include a first interface circuit 120 in addition to the FTL 110. The controller 210 of the storage system 200 may include a bad block manager 211 and a second interface circuit 212. The storage device 220 may include a plurality of storage mediums, where each of the storage mediums may respectively include one or more memory device(s), such as a flash memory chip. Also, each of the storage mediums may include a memory cell array 221 including a plurality of blocks. In FIG. 1, the one or more of the memory cell array(s) 221 provided by the storage device 220 may be assumed to be included in one storage medium.

In order to reliably perform data processing over an extended period of time, the storage system 200 must perform various management operations. Examples of commonly performed management operations include; LA to PA and/or PA to LA address conversion, block mapping—including bad block mapping and management, etc. Many of the management operations may require access to (or be based on) certain metadata stored by the storage system 200. This being the case, the reliability and timely access of the stored metadata are highly significant factors in the successful operation of the storage system 200.

However, in certain conventional OC-SSD environments, the host system 100 may not be able, under certain circumstances, to accurately and timely determined one or more characteristics for data stored in the storage device 200. For example, the host system may not know a physical characteristic associated with a bad block in the storage device 220. Accordingly, the host system 100 may be materially limited in its management of critical information, such as metadata.

For example, when a particular block (e.g., a first block) of the storage device 220 is determined to be a bad block, the host system 100 may replace (or map) the first block onto another block (e.g., a second block) which is known to be a normal block. Here, the terms "bad" and "normal" are relative in nature and may be variously defined. However, in the description of certain embodiments, a bad block is a block deemed unsuitable by characteristic(s) to the storage of metadata. Once the first block has been address mapped onto the second block, the resulting (or updated) block map information may be used to prevent the physical storing of critical data (e.g., metadata) to the first block.

Unfortunately, when the first block was used to store metadata and is then determined to be a bad block, the block map information associated with the first block is replaced with the second block, and the metadata is stored in the second block—the host system 100 may have a problem when it fails to check the nature and/or location of the second block now identified by the block map information. That is, when the data processing system 10 is powered on again following a power-off, the host system 100 must read metadata from the storage device 220 and perform certain management operation(s) associated with the stored metadata. But this process may not proceed as intended if the host system cannot accurately or timely know that a particular block storing the metadata has been physically changed from the first block to the second block.

According to certain embodiments of the inventive concept, in order to ensure the reliability of critical information such as metadata and perform efficient management, some management operations capable of being applied to the data processing system 10 may be performed by the storage system 200. According to an embodiment, the bad block manager 211 may perform a management operation associated with a bad block, and for example, the bad block manager 211 may perform a bad block management operation for blocks storing critical information such as metadata. Moreover, in order to ensure the reliability or integrity of the metadata, the bad block manager 211 may perform a repair operation for metadata stored in the high reliability blocks.

The host system 100 and the storage system 200 may variously communicate and/or receive (hereafter, "communicate") requests, data and/or information using the first interface circuit 120 and second interface circuit 212 while operating consistent with at least one protocol and data format, such as those defined for the NVMe interface.

The data storage space (or capacity) provided by the storage device 220 of the storage system 200 may be physically and/or conceptually divided into a plurality of blocks. Blocks may be identified by a particular designation and/or location within the storage device 220. Among the plurality of blocks, some blocks may be designated as providing high data storage reliability (hereafter, "high reliability block(s)"). Data reliability for a particular block may be variously determined, and the designation of a high reliability block is a relative one. For example, a high reliability block may be a so-called error free (EF) block exhibiting relatively few (or no) errors during testing, or calculated to provide a very low relative probability of error.

However, determined or designated a number of high reliability blocks may be identified by the storage system 200 to the host system when "block information" Info_BLK is communicated from the storage system 200 to the host system 100. With reference to the block information Info_BLK, the host system 100 may communicate a "block allocation request" Req_BLK to the storage system 200. Here, the block allocation request Req_BLK is used to allocate a high reliability block for the storing of critical data (e.g., metadata) with reference to the block information Info_BLK.

The block information Info_BLK may include various kinds of information. For example, the block information Info_BLK may include information identifying (by location and/or designation, such as a block address) one or more high reliability blocks within the storage system 200. The block information Info_BLK may also include information associated with an repair technique (or a repair operation) that may be used to support or improve the data integrity of certain block(s).

As noted above, the high reliability blocks in the storage system 200 may be variously determined. For example, certain blocks among the plurality of blocks provided by the storage device 220 may include multi-level memory cells (MLC) (i.e., memory cells normally used to store two or more data bits per one memory cell), where the MLC are instead used to store only a single bit of data. In other words, certain high reliability blocks will be blocks including MLC used as single-level memory cells (SLC) to store single bit data. Alternatively, the storage system 200 may perform a self-test operation to determine blocks providing relatively high reliability, or a process of selectively enhancing blocks of specific locations may be applied during the manufacturing process, thereby providing high reliability block(s) in the storage system 200.

Additionally or alternatively, the storage system 200 may perform a repair operation to improve data reliability during the writing and/or reading of metadata from a block. For example, various data recovery approaches, such as redundant array of inexpensive disk (RAID) or data mirroring may be applied to the storage system 200.

The block allocation request Req_BLK communicated from the host system 100 to the storage system 200 may be variously defined to include a variety of information. For example, the host system 100 may indicate a number and corresponding locations of high reliability blocks to be used as block storing critical data like metadata using the block allocation request Req_BLK. Thus, the block allocation request Req_BLK may include information identifying a number and/or location(s) of high reliability blocks. The block allocation request Req_BLK may also be used to identify a repair operation to be applied to the data processing system 10 from among a number of available repair operations (or techniques).

The data storage space (or capacity) provided by the storage device 220 of the storage system 200 may be further divided (physically and/or conceptually) into a plurality of regions, where each region includes one or more blocks. A region including one or more high reliability blocks may be designated as a "meta region", whereas a region including only blocks storing non-meta data (e.g., user data) may be designated as a "normal region". In this regard, certain blocks provided by the storage device 220 may be designated as "reserve blocks". Reserve blocks may be unallocated (or not currently used to store data), and may be normal block(s) in a normal region and/or high reliability block(s) in a meta region.

In the embodiment illustrated in FIG. 1, the storage device 220 provides a meta region Reg_Meta including 'M' blocks BLM1_1 to BLK1_M, and a normal region Reg_Normal including 'N' blocks BLM2_1 to BLK2_N, where 'M' and 'N' are integers greater than 1.

With this exemplary configuration, the host system 100 may identify (or select) a repair operation, and one or more high reliability reserve blocks included in the meta region Reg_Meta used in performing the repair operation. Allocation of the high reliability reserve blocks may be variously performed. For example, the host system 100 may select one or more reserve block(s), and information identifying the number and/or locations of the reserve blocks may be included in the block allocation request Req_BLK. Alternatively, information associated with a selected repair operation may be included in the block allocation request Req_BLK. Thus, the data processing system 10 may be implemented such that the storage system 200 may additionally designate one or more high reliability reserve blocks in a meta region Reg_Meta in response to a block allocation request Req_BLK. In this regard, it should be noted that a different number of reserve blocks may be needed depending upon that nature of the selected repair operation. Hence, the selected repair operation must be taken into consideration when the host system 100 and/or the storage system 200 allocate one or more blocks as reserve blocks.

Accordingly, the host system 100 may provide the storage system 200 with an identification (e.g., an address(es)) of one or more high reliability block(s) in the meta region Reg_Meta that may be used to store critical data such as metadata as part of a block allocation request Req_BLK. In contrast, when the host system 10 issues a block allocation request Req_BLK for one or more normal block(s) of the normal region Reg_Normal to store user data, the host system 100 may provide the storage system 200 with address(es) identifying the normal block(s).

According to an embodiment, in the OC-SSD environment, the storage system 200 may provide the host system 100 with information about high reliability blocks, and the host system 100 may select one or more high reliability blocks to store critical data such as metadata, thereby enhancing or ensuring the integrity of the metadata. The system management overhead performed by the host system 100 may decrease, thereby improving the overall performance of the data processing system 10. And even when a block storing metadata is determined to be a bad block, one or more error(s) in the metadata may be readily repaired using the above described approach to performing a selected repair operation. Further, even when a block storing metadata is replaced with another block, the host system 100 may access information stored in high reliability blocks included in a meta region Reg_Meta, or may access only information stored in a high reliability reserve block corresponding to a bad block, thereby checking block map information. Accordingly, the time required to check information associated with metadata may be reduced, and the overall efficiency of management for critical data such as metadata may be enhanced.

Figure 2:
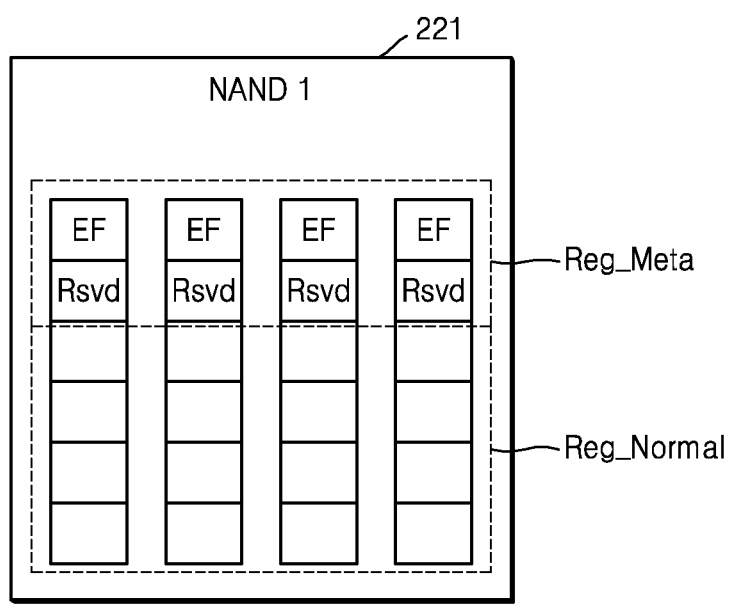
FIG. 2 is a block diagram illustrating an example of blocks allocated to a meta region and a user region.

FIG. 2 is a block diagram further illustrating in one example an approach to the allocation of blocks in a meta region Reg_Meta and a normal region Reg_Normal. Here, the illustrated example of FIG. 2 assumes the use of a NAND flash memory as a storage medium.

Referring to FIGS. 1 and 2, the memory cell array 221 may include a plurality of blocks including one or more high reliability blocks. The storage system 200 may communicate block information Info_BLK to the host system 100, and the host system 100 may communicate a block allocation request Req_BLK that may be used to select at least one high reliability block to be used to store metadata. In addition, the host system 100 may select a repair operation that may be used to repair errant metadata, as well as at least one reserve block Rsvd that may be used to store information during the repair operation.

In the illustrated example of FIG. 2, four (4) high reliability blocks (EF) are allocated to the meta region Reg_Meta and four (4) reserve blocks are allocated. In other embodiments, a varying number of high reliability blocks and/or reserve blocks may be allocated to the meta region Reg_Meta.

Various operations for repairing error(s) in the metadata may be applied, and according to various embodiments, operations using data mirroring or repair parity may be applied. For example, in a case where a data mirroring operation is applied, the host system 100 may issue a request to write the metadata to a high reliability block, and the storage system 200 may write the metadata to the high reliability block and a reserve block corresponding thereto. Subsequently, when a high reliability block storing metadata is determined to be a bad block, the storage system 200 may map an address of the high reliability block to the corresponding reserve block and may store block map information therein. Also, when the host system 100 issues a request to access metadata stored in the high reliability block, the storage system 200 may access the corresponding reserve block with reference to the block map information.

According to an embodiment, in a case where a repair operation includes use of repair parity information, the host system 100 may issue a request to write metadata to a high reliability block, and the storage system 200 may generate a repair parity information from the write-requested metadata and/or other metadata configuring one repair unit and may store the generated repair parity to a reserve block. For example, the other metadata configuring the repair unit may be stored in a block (e.g., at least another high reliability block) different from the write-requested high reliability block. For example, when a high reliability block storing metadata read-requested by the host system 100 is determined to be a bad block, the storage system 200 may repair an error in the metadata according to an arithmetic operation using the repair parity information and other metadata of a repair unit and may provide error-repaired metadata to the host system 100.

Moreover, a correctable error rate may vary by adjusting a number of reserve blocks included in the meta region Reg_Meta, or by adjusting a ratio of a number of reserve blocks to a number of high reliability blocks. For example, when there is a number of reserve blocks, relatively more parity bits may be stored based on data of the same bit, and thus, error correction ability may be enhanced. For example, when there is a number of reserve blocks, an error correction circuit having high error correction ability may be applied to the storage system 200, and in this case, an ability to correct an error of the metadata may be more enhanced.

In the embodiment of FIG. 2, a data mirroring approach where metadata is once copied has been described, but embodiments are not limited thereto. For example, metadata may be twice copied (or more) and may be stored in a reserve block, and when a number of reserve blocks are allocated, a repair operation based on a plurality of copy operations may be applied.

Figure 3:
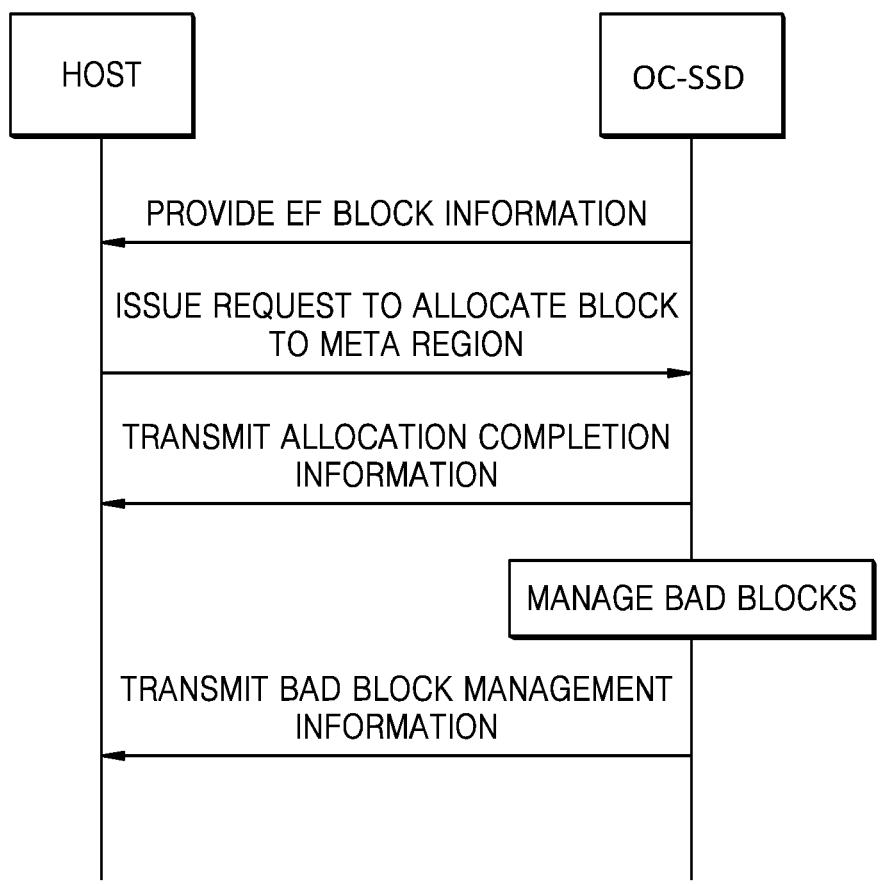
FIG. 3 is a conceptual diagram illustrating an operating method of a data processing system, according to an embodiment.

FIG. 3 is a conceptual diagram illustrating in one example an operating method for the data processing system 10 of FIG. 1. In FIG. 3, a flash memory based OC-SSD is assumed as an example of a storage system, and thus, a host system HOST is assumed to include the flash translation layer (FTL).

Once the OC-SSD is connected to the host system HOST, a device initialization process may be performed, wherein metadata required to manage the OC-SSD must be stored during the device initialization process. To this end, the OS-SSD may communicate (e.g., transmit) block information Info_BLK describing a meta region including one or more blocks that may have been set during a device formatting process. And as noted above, the block information Info_BLK provided to the host system HOST by the OC-SSD may include information describing one or more high reliability block(s) in a meta region Reg_Meta, one or more reserve block(s), and one or more repair operations supported by the OC-SSD.

Upon receiving the block information Info_BLK, the host system HOST may issue a block allocation request Req_BLK requesting the allocation of one or more high reliability block(s) to the meta region Reg_Meta. For example, a number and corresponding location(s) of high reliability blocks to be allocated to the meta region may be selected by the host system HOST, and information identifying at least one repair operation to be applied to the meta region may be included in the block allocation request Req_BLK. In response to the block allocation request Req_BLK from the host system HOST, the OC-SSD may allocate one or more high reliability blocks to the meta region. The OC-SSD may also allocate one or more reserve blocks to be used during the repair operation to the meta region. The OC-SSD may then communicate information to the host system HOST indicating that the requested allocation is complete.

Subsequently, as a data access operation is performed by the OC-SSD, metadata relevant thereto may be stored or updated in the meta region and an error in the metadata may be corrected or repaired using various repair operations such as data mirroring and/or a recovery algorithm. Also, the OC-SSD may perform bad block management operation(s) on blocks allocated to the meta region and may store block map information generated during the management of the bad blocks. According to an embodiment, the OC-SSD may communicate "bad block information" associated with management of bad blocks to the host system HOST, and the host system HOST may then accurately determine the current block state for the meta region used to store metadata in response to the bad block information.

Figure 4:
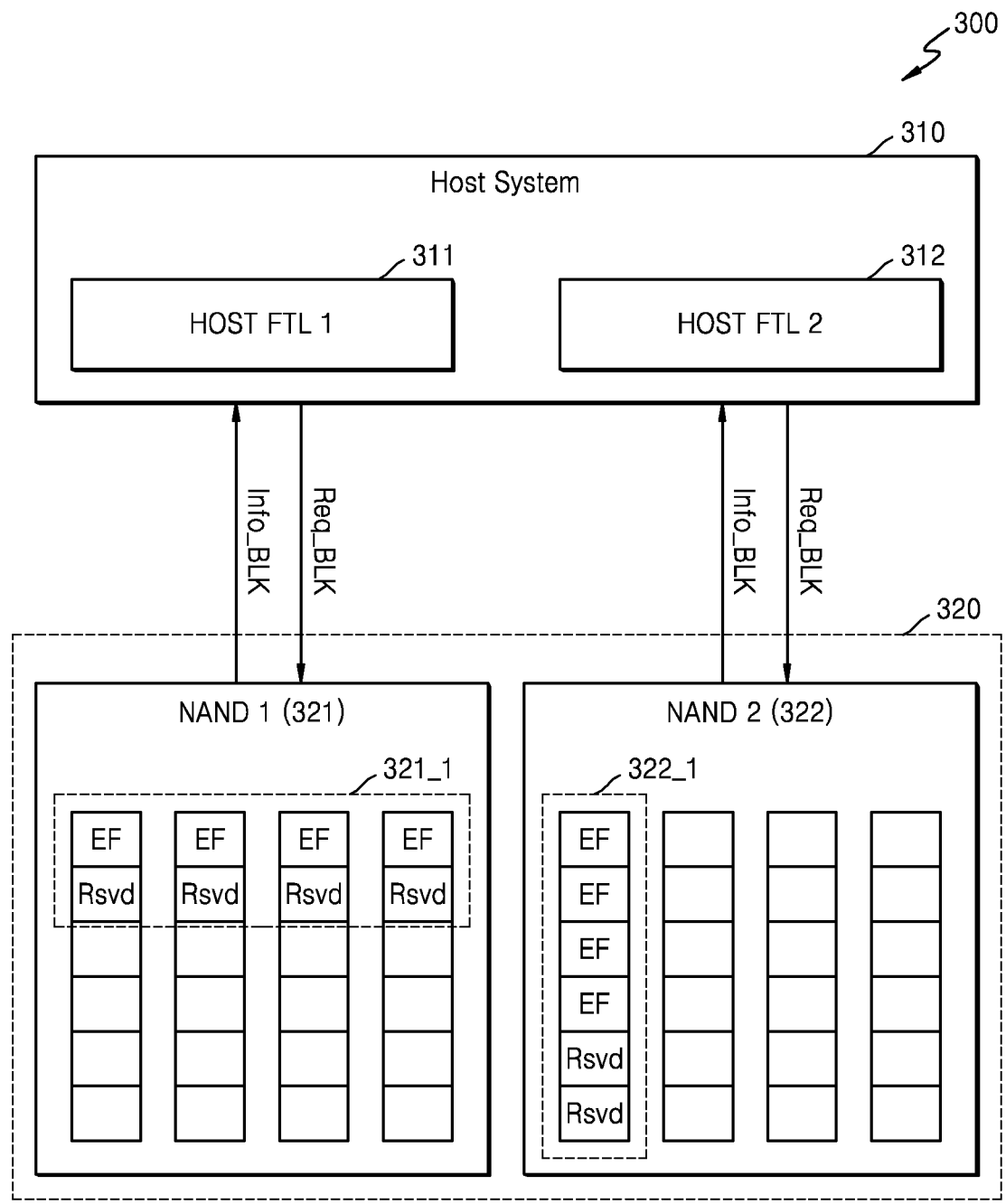
FIG. 4 is a block diagram illustrating an implementation example of a data processing system according to an embodiment.

FIG. 4 is a block diagram illustrating in one example a data processing system 300, wherein a meta region associated with each one of a plurality of NAND flash memory devices is used to store critical data such as metadata.

Referring to FIG. 4, the data processing system 300 may include a host system 310 and a storage system 320. In FIG. 4, for convenience of description, only a first flash memory array NAND1 and a second NAND flash memory array NAND2 (i.e., first and second storage mediums) 321 and 322 are shown in the storage system 320. However, those skilled in the art will recognize that the storage system 320 may further include additional storage medium as well as control and logic components used to perform at least management operations associated with blocks used to store critical data such as metadata.

The host system 310 may include a management module (e.g., a NAND management module, not shown) capable of performing certain management operations associated with the storage system 320. Accordingly, the management module may include an FTL (or a host FTL). In FIG. 4, a first host FTL 311 may be used to manage the first storage medium 321 and a second host FTL 312 may be used to separately manage the second storage medium 322. However, a single FTL may be used to manage a plurality of storage mediums. Also, according to the above-described embodiments, the storage system 320 may communicate block information Info_BLK to the host system 310, and the host system 310 may communicate a block allocation request Req_BLK to the storage system 320. For example, respective block information Info_BLK and block allocation requests Req_BLK may be communicated for each NAND flash memory device, wherein the first host FTL 311 communicates first block information Info_BLK and a first block allocation request Req_BLK to/from the first NAND flash memory array 321, while the second host FTL 312 communicates second block information Info_BLK and a second block allocation request Req_BLK to/from the second NAND flash memory array 322. Alternately, a single block information Info_BLK may be used to describe the storage system 320 to the host system 310, and a single block allocation request Req_BLK may be used to variously allocate blocks in the storage system 320.

It is assumed that each one of the first and second flash memory arrays 321 and 322 includes a plurality of blocks, wherein each plurality of blocks includes at least one high reliability block (EF) and at least one reserve block (Rsvd). With this assumption, based on a first block allocation request Req_BLK from the host system 310, meta regions 321_1 and 322_1 may be respectively set in the first and second storage mediums 321 and 322, and one or more high reliability blocks and reserve blocks Rsvd may be allocated to each of the meta regions 321_1 and 322_1. In FIG. 4, an example where various blocks are differently allocated across the meta region 321_1 of the first storage medium 321 and the meta region 322_1 of the second storage medium 322 is illustrated.

According to an embodiment, first metadata associated with the first storage medium 321 may be stored in the meta region 321_1 of the first storage medium 321, and second metadata associated with the second storage medium 322 may be stored in the meta region 322_1 of the second storage medium 322. It is further assumed that a repair operation using a data mirroring technique may be applied to the meta region 321_1 of the first storage medium 321. Accordingly, the number of reserve blocks is equal to the number of high reliability blocks allocated in the meta region 321_1. On the other hand, it is assumed that a repair operation using a repair parity techniques may be applied to the meta region 322_1 of the second storage medium 322. Accordingly, a fewer number of reserve blocks than high reliability blocks may be allocated in the meta region 322_1.

Figure 5:
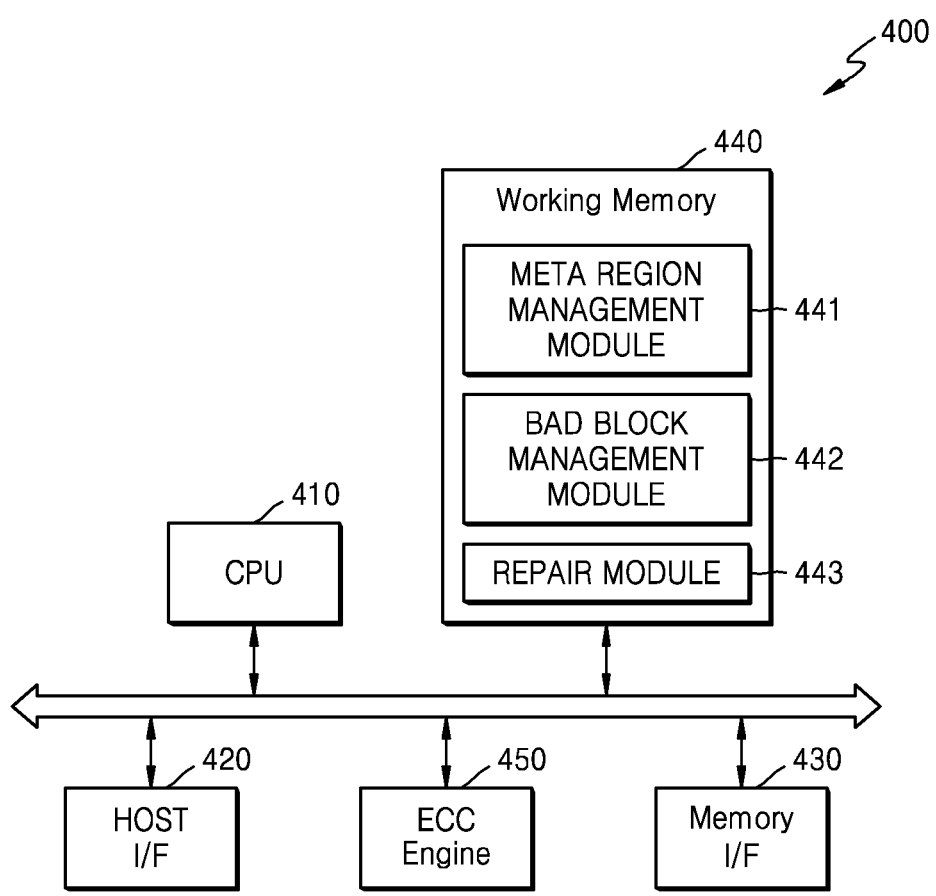
FIG. 5 is a block diagram illustrating an implementation example of a controller included in a storage system according to an embodiment.

FIG. 5 is a block diagram illustrating in one example a controller 400 that may be incorporated in a storage system according to an embodiment.

Referring to FIG. 5, the controller 400 may include a central processing unit (CPU) 410 or processor, a host interface circuit 420, a memory interface circuit 430, and a working memory 440. Here, the controller 400 may further include an error correction code (ECC) engine 450.

The CPU 410 may execute various applications (e.g., programs) stored in the working memory 440 to control an overall operation of the storage system. The host interface circuit 420 may control communication with a host system according to an interface using at least one established data format and at least one communication protocol, such as those consistent with NVMe. Also, the memory interface circuit 430 may provide an interface with a plurality of storage mediums included in a storage device, and for example, the memory interface circuit 430 may perform independent communication with the storage mediums through a plurality of channels. Also, the ECC engine 450 may perform an operation of detecting and correcting an error of data stored in the storage device, and for example, may generate an ECC parity from written data and may perform an error detection operation and an error correction operation by using read data and the ECC parity corresponding thereto.

Moreover, programs for performing various functions according to an embodiment and a function of the storage system may be loaded into the working memory 440. The working memory 440 may be implemented as various types such as RAM, read-only memory (ROM), electronically erasable programmable read only memory (EEPROM), flash memory, or other memory technologies.

According to an embodiment, a meta region management module 441, a bad block management module 442, and a repair module 443 may be loaded into the working memory 440. For example, according to the above-described embodiments, the host interface circuit 420 may communicate with the host system to receive various requests, communicate various information, and receive a block allocation request requesting allocation of one or more high reliability blocks where metadata is to be stored, from the host system. The CPU 410 may execute the meta region management module 441, and based on a block allocation request from the host system, may perform an operation of allocating one or more high reliability blocks and/or reserve blocks to a meta region.

Metadata (as one example of critical data) may be stored in a high reliability block and/or a reserve block included in the meta region, and based on execution of the bad block management module 442, a management operation may be performed on a bad block identified in the meta region. For example, when a high reliability block (e.g., a first high reliability block) is determined to be a bad block, the bad block management module 442 may manage a block map to replace the first high reliability block with another high reliability block. Moreover, the bad block management module 442 may perform a block management operation indicating a reserve block storing a repair parity information or a high reliability block storing other metadata configuring the same repair unit as metadata of the first high reliability block. Also, by executing the repair module 443, an error occurring in the first high reliability block may be repaired, and for example, an access operation may be performed on a reserve block corresponding to the first high reliability block or an error may be repaired through an arithmetic operation using a repair parity and other metadata configuring a repair unit.

In FIG. 5, an example where a metadata management operation and a bad block management operation according to an embodiment are performed by software is illustrated, but embodiments are not limited thereto. For example, in the embodiment of FIG. 5, at least some of operations performed by executing software loaded into the working memory 440 may be performed by using a circuit implemented with hardware.

Figure 6A:
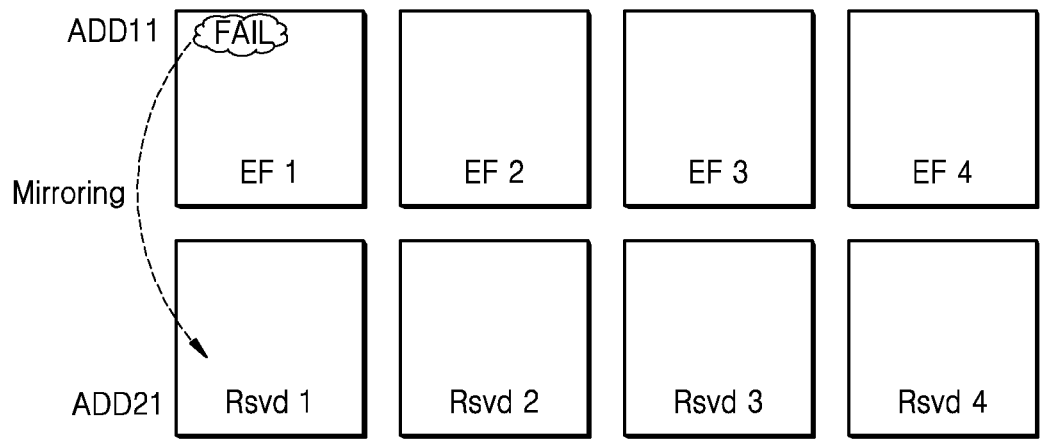
FIGS. 6A and 6B are block diagrams illustrating an example which repairs an error occurring in metadata, according to an embodiment.
Figure 6B:
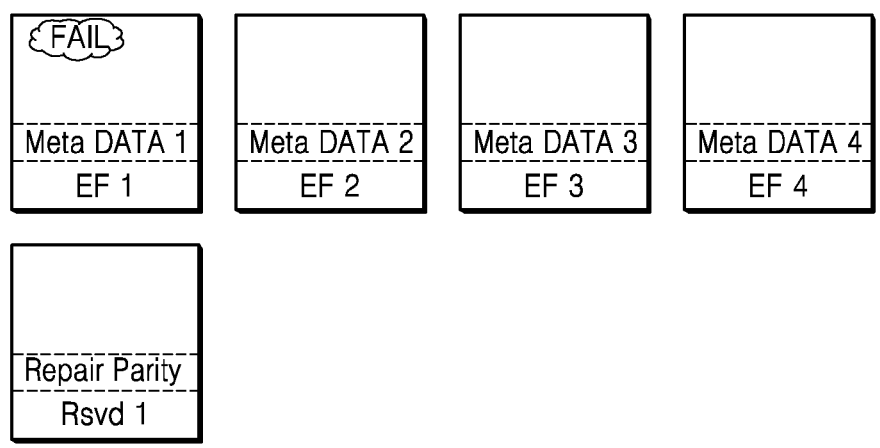

FIGS. 6A and 6B are respective conceptual block diagrams illustrating in one example the repairing of an error occurring in metadata according to an embodiment.

Referring to FIG. 6A, a first example is shown, wherein first to fourth high reliability blocks EF 1 to EF 4 storing metadata and first to fourth reserve blocks Rsvd 1 to Rsvd 4 corresponding thereto are allocated to a meta region. A host system may issue a request to write metadata in the first to fourth high reliability blocks EF 1 to EF 4, and a storage system may write the metadata, written in the first to fourth high reliability blocks EF 1 to EF 4, in the first to fourth reserve blocks Rsvd 1 to Rsvd 4 as part of a data mirroring technique.

For example, the host system may provide the storage system with a first address ADD11 indicating the first high reliability block EF 1 and metadata, and the storage system may write the metadata in the first high reliability block EF 1 and may also write the metadata in the first reserve block Rsvd 1 corresponding to the first high reliability block EF 1. The storage system may know a second address ADD21 indicating the first reserve block Rsvd 1 and may internally manage block map information which includes mapping information about the first address ADD11 and the second address ADD21. Subsequently, in a case where the first high reliability block EF 1 is determined to be a bad block, when a request for accessing metadata of the first high reliability block EF 1 is received from the host system, the storage system may write the metadata in the first reserve block Rsvd 1, or may read the metadata from the first reserve block Rsvd 1.

Moreover, a metadata portion may include repair information (or a repair unit), and repair parity information corresponding to the repair unit may be generated and stored in a meta region. The storage system may perform a data recovery algorithm based on RAID by using the metadata portion and may store the resulting repair parity information, generated based on a result of performing the recovery algorithm, in a reserve block. In FIG. 6B, another example is illustrated, wherein first to fourth metadata Meta DATA 1 to Meta DATA 4 are stored in first to fourth high reliability blocks EF 1 to EF 4 configure one repair unit and a corresponding repair parity information is stored in a first reserve block Rsvd 1.

When data of at least one of the first to fourth metadata Meta DATA 1 to Meta DATA 4 stored in the first to fourth high reliability blocks EF 1 to EF 4 is changed, the repair parity information must be updated. Accordingly, when the first high reliability block EF 1 is determined to be a bad block, an error in the first metadata Meta DATA 1 may be repaired using the second to fourth metadata Meta DATA 2 to Meta DATA 4 stored in the second to fourth high reliability blocks EF 2 to EF 4, as repair parity information.

Figure 7:
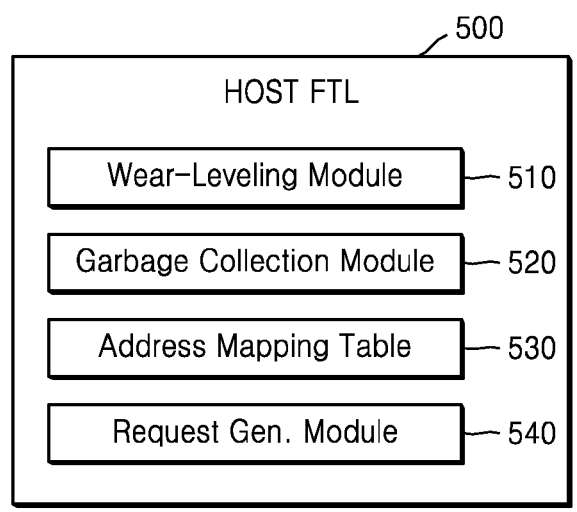
FIG. 7 is a block diagram illustrating an implementation example of a host flash translation layer (FTL) included in a host system.

FIG. 7 is a block diagram illustrating in one example a host FTL 500 that may be used as a host system. Referring to FIG. 7, the host FTL 500 may be loaded into a working memory (not shown) of the host system, and based on a function implemented by software, the host FTL 500 may include a wear-leveling module 510, a garbage collection module 520, an address mapping table 530, and a request generating module 540. The host FTL 500 may be used to control, at least in part, an OC-SSD. Thus, the host FTL 500 may perform a management operation on the OC-SSD, generate metadata associated with the management operation, and store the generated metadata in the OC-SSD. The wear-leveling module 510 may manage a wear-level of each of storage mediums included in the OC-SSD. Memory cells of the storage mediums may be aged by a writing operation, an erase operation, etc., and an aged memory cell (or a worn memory cell) may cause a defect. The wear-leveling module 510 may manage an erase cycle and a program corresponding to a memory cell array, thereby preventing a specific cell region from being earlier worn than other cell regions. The garbage collection module 520 may arrange blocks storing data fragments. For example, in a flash memory device, an erase unit may be set to be greater than a program unit, a program operation and an erase operation may be repeated, and an operation of collecting pieces of valid data, distributed in physically different blocks, in the same block by using an arbitrary free block may be performed subsequently. A free block may be generated based on an operation of the garbage collection module 520 Also, in OC-SSD environment, the host system may perform an address conversion operation between a logical address and a corresponding physical address. The resulting mapping information between the logical address and the physical address may be stored in the address mapping table 530. Also, according to embodiments, the request generating module 540 may generate various requests associated with management of a meta region. For example, the request generating module 540 may generate a block allocation request including information about one or more blocks which are to be allocated to the meta region, based on block information about the storage system. Also, according an embodiment described below, the host system may issue a request to additionally allocate a reserve block to the meta region, and the request generating module 540 may generate an addition allocation request for additionally allocating a reserve block. In addition, according to the above-described embodiments, the request generating module 540 may perform various processing operations associated with the meta region.

Figure 8:
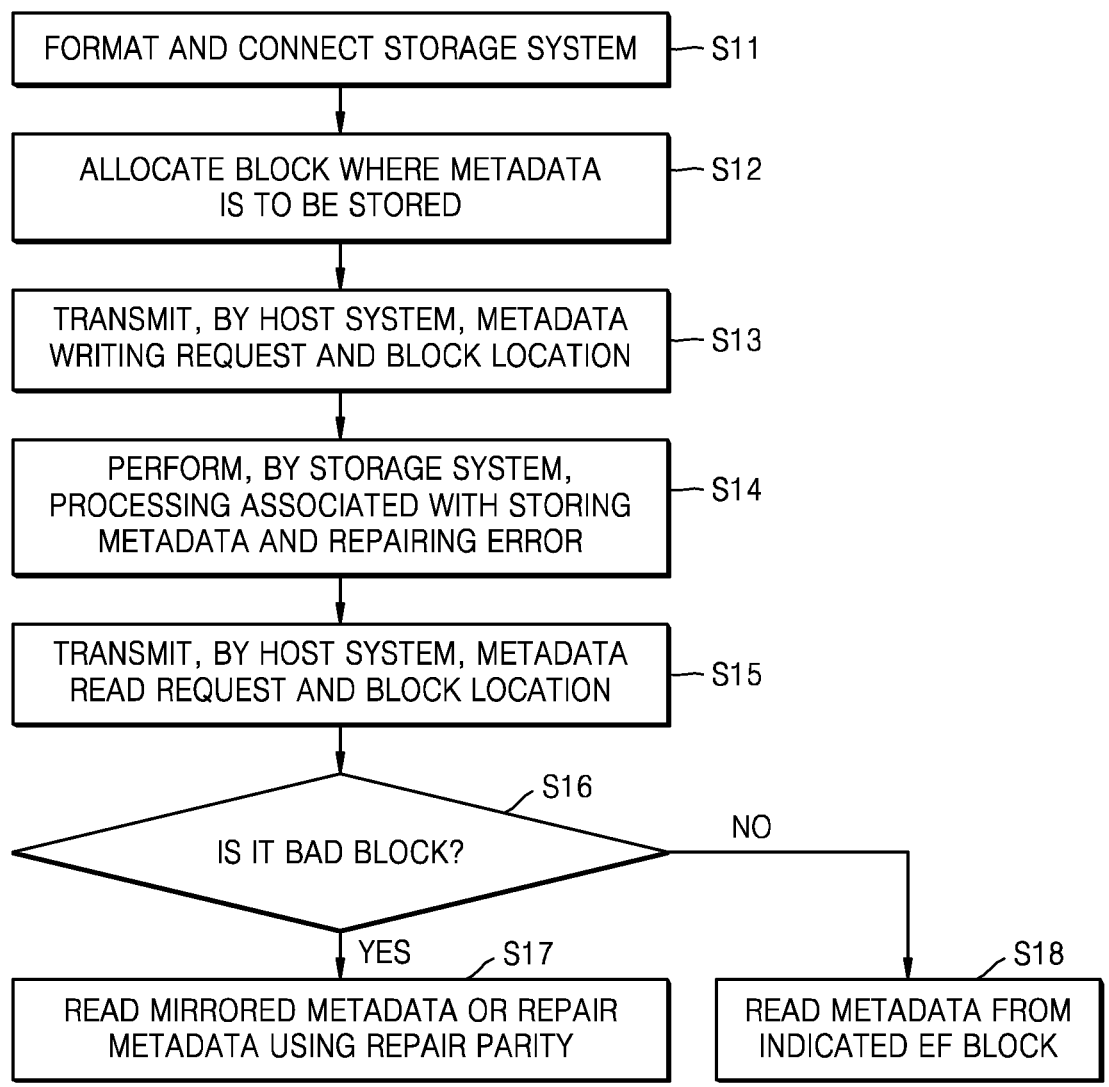
FIG. 8 is a flowchart illustrating an operating method of a data processing system, according to an embodiment.

FIG. 8 is a flowchart summarizing an operating method for a data processing system, according to an embodiment.

Referring to FIG. 8, the data processing system may include a host system including a host FTL, and an OC-SSD. According to an embodiment, the OC-SSD may be used at least in part to manage the storing of metadata in such a manner to ensure the reliability of the metadata.

As an operation example, a storage system corresponding to the OC-SSD may be properly formatted and connected to the host system (S11). This formatting and connecting may be accomplished by performing an initialization operation on the data processing system. During the initialization process, information describing the storage system may be provided to the host system, such as information identifying a number and the corresponding location(s) of high reliability blocks (EF) included in the storage system, as well as information indicating which repair operation(s) are supported by the storage system.

Then, the host system may issue a block allocation request Req_BLK to the storage system. In response, the storage system to manage memory resources such that at least one high reliability block is designated for the storing of critical data such as metadata. As part of this management process a repair operation may be applied to the metadata.

For example, according to the above-described embodiments, information identifying a number and/or locations of high reliability blocks capable of storing metadata may be included in the block allocation request Req_BLK. Thus, based on the block allocation request Req_BLK received from the host system, the storage system may allocate a high reliability block from a meta region that may be used to store metadata (S12). According to the above-described embodiments, one or more high reliability blocks and one or more reserve blocks used to repair an error in the metadata may be allocated to the meta region.

Subsequently, as a memory operation is performed, the host system may provide the storage system with a writing request for the metadata and may communicate information, indicating a block location where the metadata is to be written, to the storage system (S13). The storage system may store the metadata in a block at the location indicated by the host system and may perform a processing operation associated with repairing metadata error(s) (S14). For example, in a case where a data mirroring operation is applied, metadata written in an high reliability block indicated by the host system may be identically written to a corresponding reserve block. Alternately, in a case where a repair parity operation is applied, repair parity information generated based on the metadata may be written in a reserve block.

Subsequently, the host system may communicate to the storage system, a read request for reading the metadata and information indicating a location for the block storing the metadata (S15).

The storage system may determine whether a block requested for reading the metadata corresponds to a bad block (S16). For example, the storage system may determine whether a defect occurs in a block, periodically or during a process of writing and/or reading data, and based on a result of the determination, the storage system may determine a corresponding block as a bad block. Also, when the block requested for reading the metadata corresponds to the bad block, the storage system may read metadata which is mirrored and stored in a reserve block or may repair the metadata by using a repair parity stored in the reserve block and may provide repaired metadata to the host system (S17). On the other hand, when a corresponding block is not a bad block, the metadata may be read from an high reliability block of a location requested from the host system (S18).

Figure 9A:
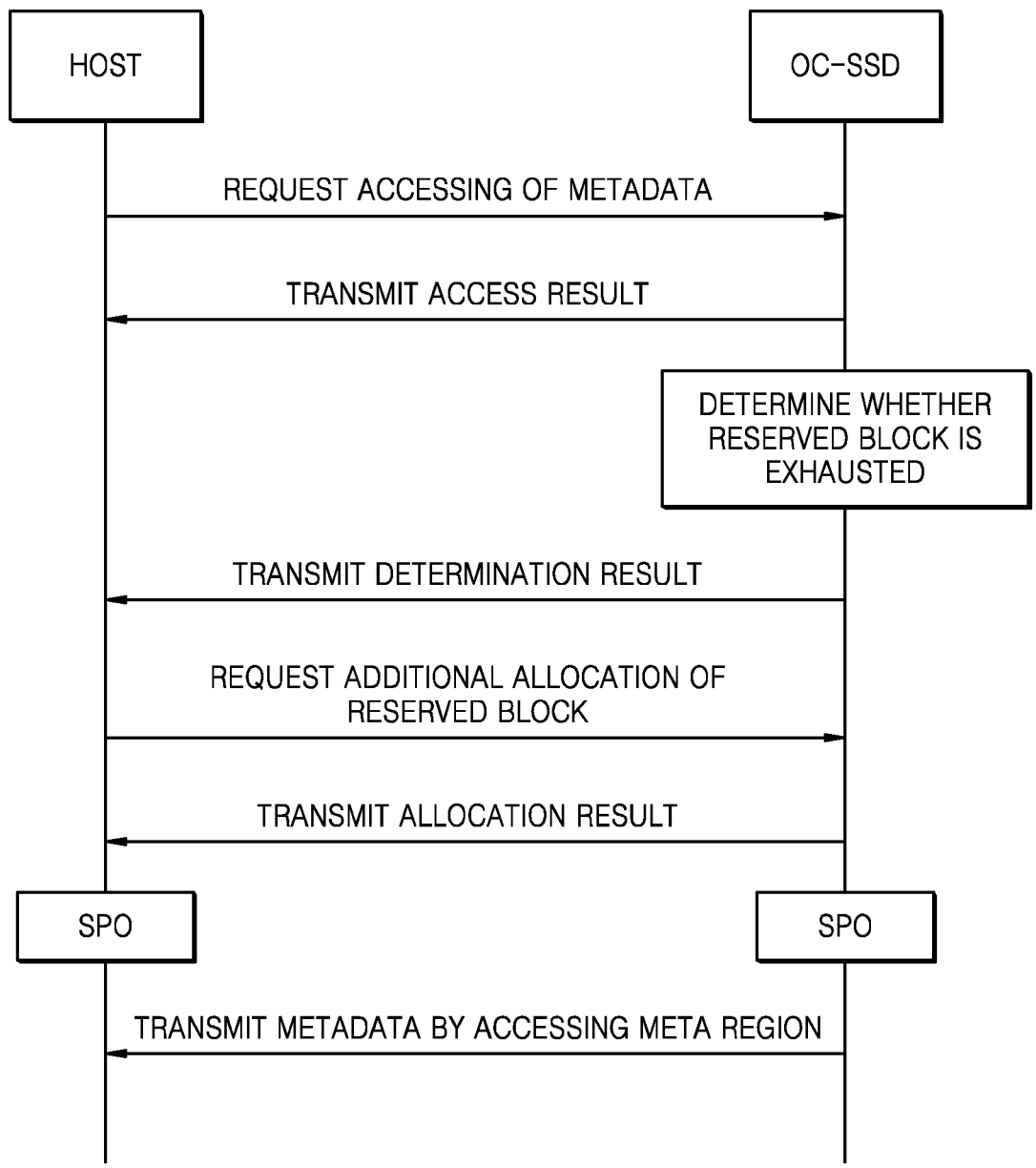
FIGS. 9A and 9B are conceptual diagrams illustrating an operation example of a data processing system according to an embodiment.
Figure 9B:
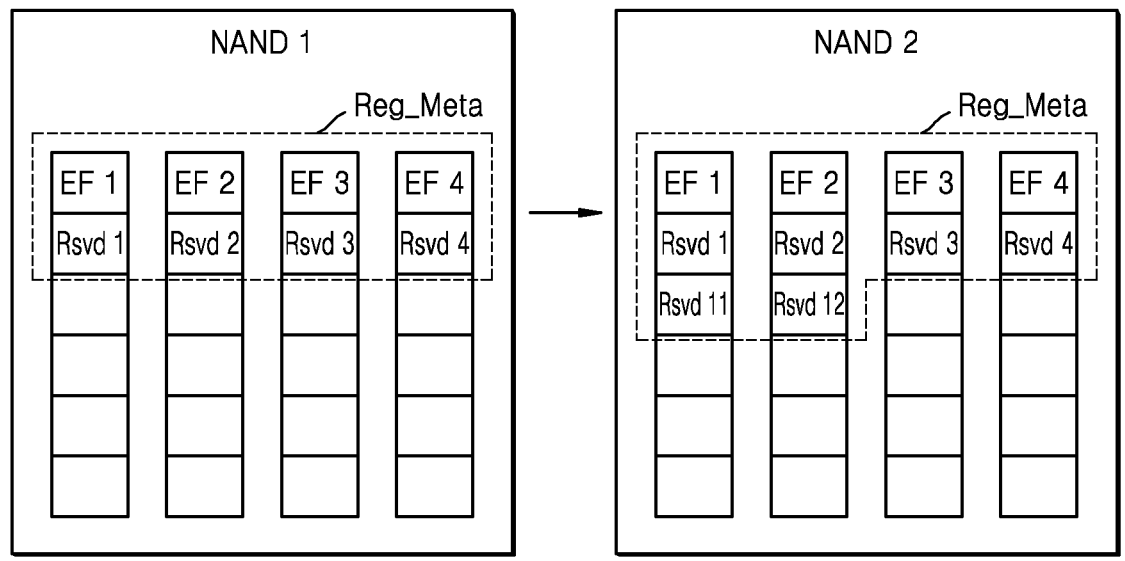

FIGS. 9A and 9B are related conceptual diagrams illustrating in one example a data processing system according to an embodiment. FIGS. 9A and 9B collectively illustrate an operation example in which a reserve block used to secure the integrity of metadata is exhausted.

Referring to FIG. 9A, a host system HOST may provide an OC-SSD with an access request for writing and reading metadata, and the OC-SSD may provide the read metadata to the host system HOST or may communicate an access result, such as information representing that writing of the metadata is completed, to the host system HOST. Also, the OC-SSD may perform a processing operation of ensuring the integrity of the metadata by using a reserve block in a process of accessing the metadata and may determine whether the reserve block is exhausted.

Whether the reserve block is exhausted may be determined based on various techniques. For example, when a meta region of the OC-SSD is in a state which is difficult to ensure the integrity of the metadata, it may be determined that the reserve block is exhausted. For example, in a case where a data mirroring technique is applied, metadata of one high reliability block (e.g., a first high reliability block) may be stored in a corresponding reserve block, and as the first high reliability block is determined to be a bad block, a reserve block corresponding thereto may be accessed. In this case, when the reserve block is also determined to be a bad block, it may be difficult to ensure the integrity of metadata stored in the first high reliability block, and in this case, it may be determined that the reserve block is exhausted.

The host system HOST may receive a result of determining whether the reserve block is exhausted and may communicate, to the OC-SSD, an addition allocation request for additionally requesting a reserve block. According to an embodiment, the host system HOST may issue a request to additionally allocate a reserve block in view of a repair operation applied to the OC-SSD, and the number and locations of reserve blocks to be additionally allocated may be included in the addition allocation request. The OC-SSD may allocate an additional block as a reserve block to a meta region and may communicate an allocation result to the host system HOST.

Various situations may occur in the data processing system, and for example, when undesired sudden power-off occurs, the OC-SSD may store information associated with an high reliability block, a reserve block, and an additionally allocated reserve block described above. Subsequently, when the data processing system is powered on, the OC-SSD may access metadata autonomously or based on a request of the host system HOST, and for example, since only blocks (e.g., a high reliability block and a reserve block) included in the meta region are accessed, metadata may be read and provided to the host system HOST. For example, the host system HOST may access only the blocks included in the meta region regardless of information from the OC-SSD, and thus, may obtain the metadata. Alternatively, the OC-SSD may know information about blocks of the meta region, and thus, may provide the information to the host system HOST, thereby increasing the efficiency of managing the metadata.

Moreover, referring to FIG. 9B, an example is illustrated wherein one or more reserve blocks are additionally allocated to a meta region. For example, as one or more high reliability blocks included in the meta region are determined to be bad blocks and a reserve block corresponding thereto is also determined to be a bad block, an additional reserve block may be allocated to the meta region. For example, in FIG. 9B, it is illustrated that, as first and second high reliability blocks EF 1 and EF 2 and reserve blocks Rsvd 1 and Rsvd 2 corresponding thereto are determined to be bad blocks, additional reserve blocks Rsvd 11 and Rsvd 12 are allocated based on the first and second high reliability blocks EF 1 and EF 2.

Figure 10:
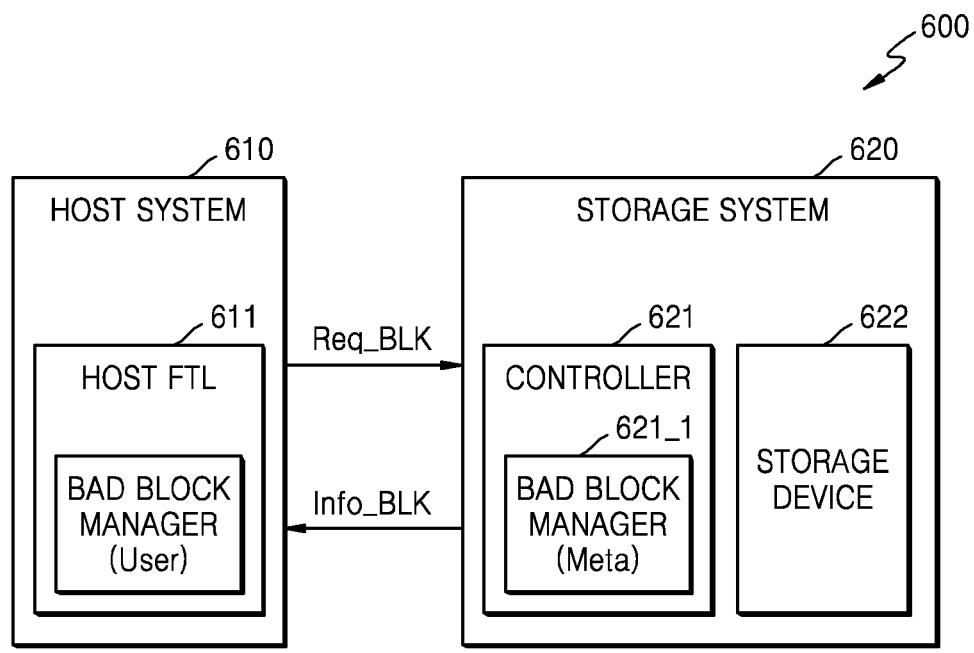
FIG. 10 is a block diagram illustrating a data processing system according to a modifiable embodiment.

FIG. 10 is a block diagram illustrating a data processing system 600 according to an embodiment.

Referring to FIG. 10, the data processing system 600 may include a host system 610 and a storage system 620, the host system 610 may include a host FTL 611, and the storage system 620 may include a controller 621 and a storage device 622. Although not shown in FIG. 10, the storage device 622 may include a plurality of storage mediums, and each of the storage mediums may include a plurality of blocks. Also, each of the storage mediums may include at least one high reliability block. According to the above-described embodiments, the storage system 620 may communicate, to the host system 610, block information Info_BLK about the blocks included in the storage mediums, and the host system 610 may communicate a block allocation request Req_BLK, including information about one or more blocks which are to be used to store metadata, to the storage system 620.

According to the above-described embodiments, management of blocks of a meta region may be performed by the storage system 620, and to this end, the controller 621 may include a bad block manager 621_1. The bad block manager 621_1 may determine whether blocks (or blocks included in the meta region) associated with storing metadata among the plurality of blocks included in the storage device 622 are bad blocks and may perform a management operation thereon. For example, when it is determined that one block of the meta region is a bad block, the bad block manager 621_1 may replace accessing of the bad block with accessing of another block and may manage a block map including information associated with replacement of blocks.

Moreover, the host FTL 611 of the host system 610 may manage bad blocks among blocks used to store user data, and thus, the host FTL 611 may include a bad block manager associated with the user data. For example, determining whether blocks are bad blocks may be performed by the storage system 620, and the storage system 620 may provide the host system 610 with information about a block determined to be a bad block among a plurality of blocks storing the user data. The host system 610 may replace accessing of a block determined to be a bad block with accessing of another block, and a block map of the blocks storing the user data may be managed by the host system 610. Also, the host system 610 may store metadata, including the block map of the blocks storing the user data, in the meta region of the storage device 622.

Figure 11A:
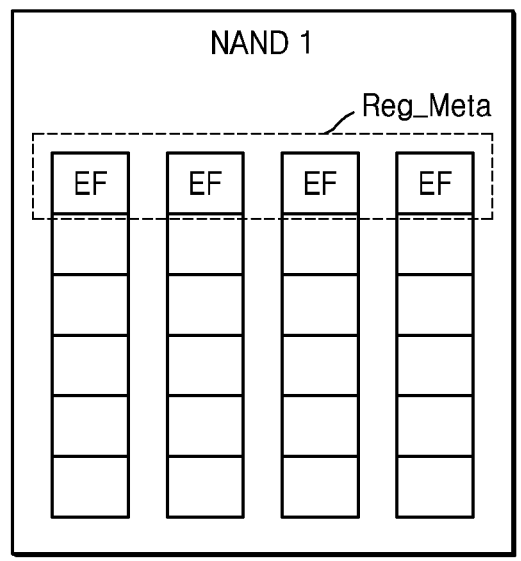
FIGS. 11A and 11B are block diagrams illustrating various examples of a block allocation operation performed in a storage system.
Figure 11B:
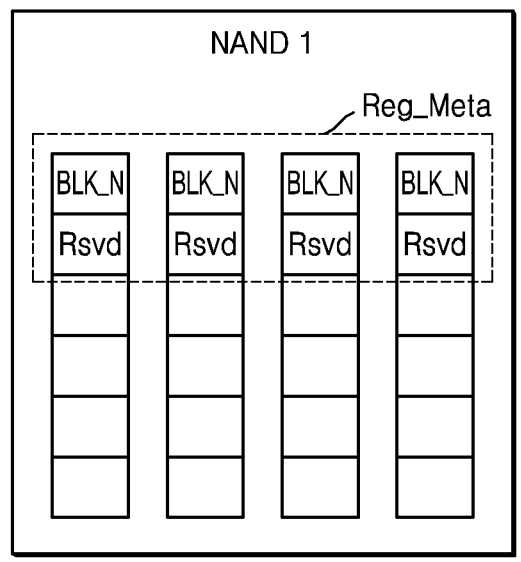

FIGS. 11A and 11B are block diagrams illustrating various examples of a block allocation operation that may be performed in a storage system.

Some of a plurality of blocks included in a storage device may be managed as high reliability blocks. According to the above-described embodiments, some of the plurality of blocks of the storage device may correspond to high reliability blocks, and for example, a block storing data on the basis of a single-level cell may correspond to an high reliability block or a block having good characteristic may be set as an high reliability block on the basis of a result of a test autonomously performed by the storage system. Alternatively, in a process of manufacturing the storage system, a process performed on some blocks may be implemented to have reliability which is relatively higher than that of other blocks, and corresponding blocks may be set as high reliability blocks.

Referring to FIG. 11A, in setting a meta region Reg_Meta including blocks where metadata is to be stored, when an high reliability block is included in a storage device, the high reliability block may be relatively high in data reliability thereof and may be very low in possibility that an error occurs, and thus, only the high reliability block may be included in the meta region Reg_Meta. In this case, a storage system or a host system may not allocate a reserve block for a repair operation to the meta region Reg_Meta for storing metadata.

On the other hand, as illustrated in FIG. 11B, in some embodiments, the storage device may include only normal blocks BLK_N without managing a separate high reliability block, and in this case, normal blocks BLK_N where metadata is to be stored and one or more reserve blocks Rsvd for a repair operation corresponding to the metadata may be allocated to the meta region Reg_Meta. That is, although normal blocks BLK_N are higher than the above-described high reliability blocks in possibility that an error occurs, a repair operation may be applied through one or more reserve blocks Rsvd, and thus, the reliability of metadata may be ensured.

Figure 12A:
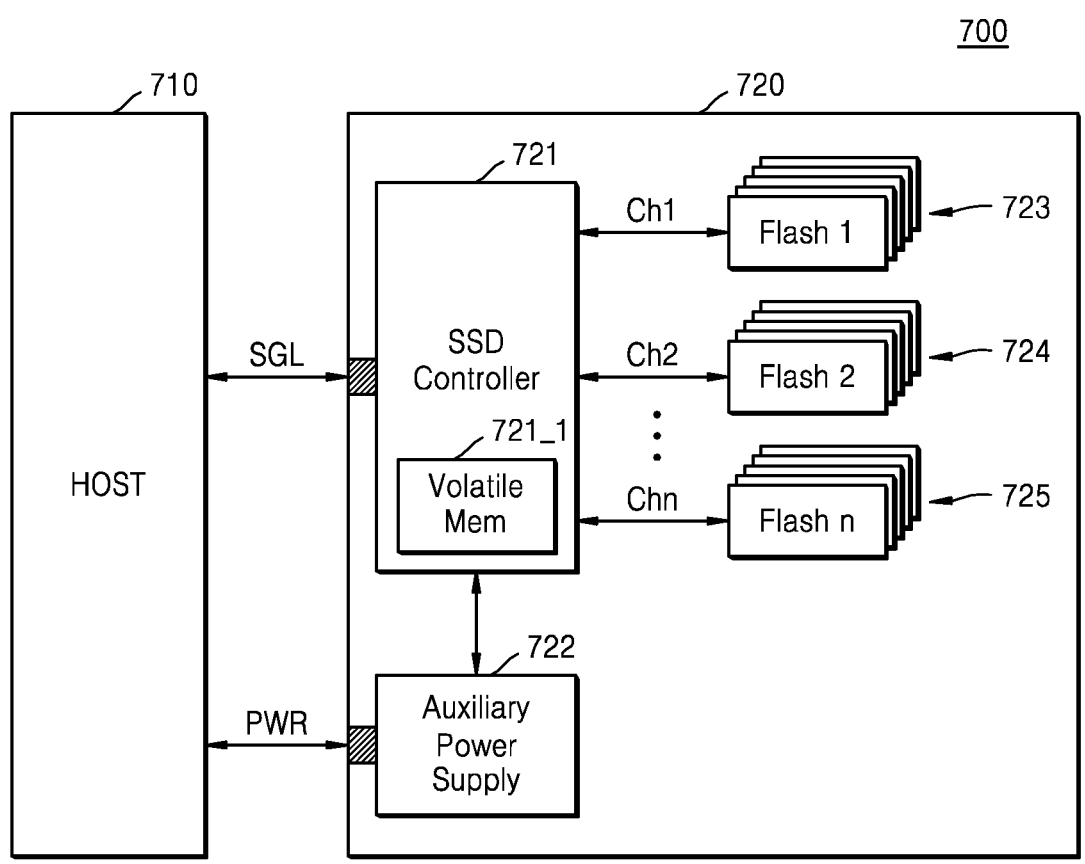
FIGS. 12A and 12B are block diagrams illustrating an example where blocks are allocated to a meta region in a solid state drive (SSD) including a plurality of storage mediums.
Figure 12B:
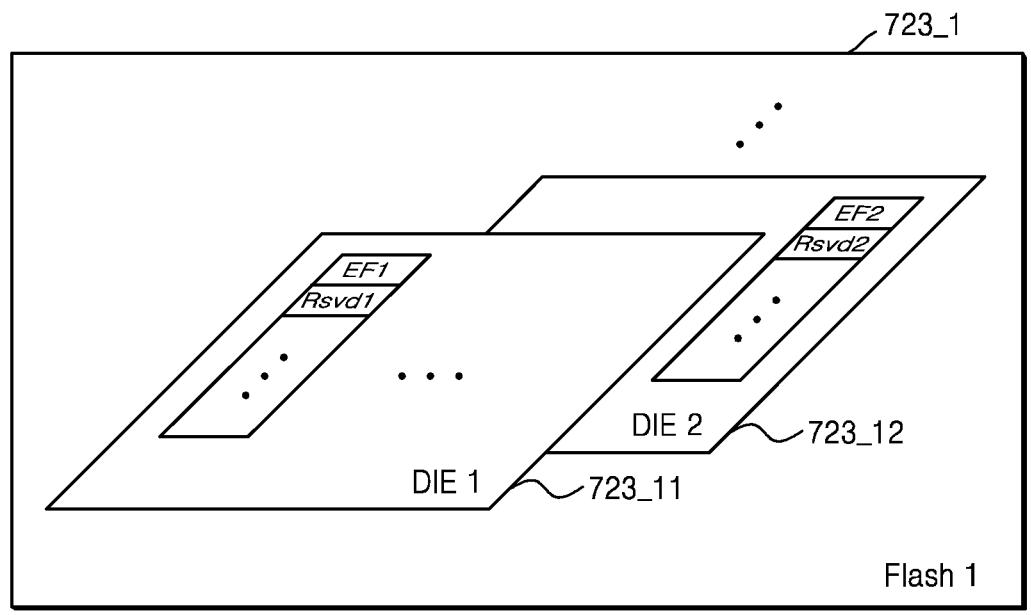

FIGS. 12A and 12B are block diagrams illustrating an example where blocks are allocated to a meta region in an SSD including a plurality of storage mediums.

Referring to FIG. 12A, a data processing system 700 may include a host system 710 and an SSD 720. The SSD 720 may correspond to the open-channel SSD according to the above-described embodiments, communicate and receive a signal to and from the host system 710 through a signal connector SGL, and receive power through a power connector PWR. The SSD 720 may include a controller 721, an auxiliary power supply 722, and a plurality of memory systems 723, 724, and 725. Each of the plurality of memory systems 723, 724, and 725 may include one or more flash memory devices as a storage device. Also, each of the flash memory devices may include one or more dies DIE, and one or more blocks may be provided in each of the dies DIE.

According to the above-described embodiments, the controller 721 may communicate with the plurality of memory systems 723, 724, and 725 through a plurality of channels Ch1 to Chn and may perform a management operation on blocks storing metadata in the SSD 720. Also, information associated with a block map may be generated through a management operation performed on blocks, and the information associated with the block map may be arbitrarily stored in a volatile memory 721_1 of the controller 721 and may be non-volatilely stored in the plurality of memory systems 723, 724, and 725. Also, the controller 721 may include a bad block manager (not shown) for performing a management operation on blocks storing metadata, and the bad block manager may be implemented based on hardware, software, or a combination thereof.

According to the above-described embodiments, a meta region storing metadata may include an high reliability block and a reserve block. For example, in a case where a repair operation uses a data mirroring technique, one high reliability block (e.g., a first high reliability block) and a reserve block (e.g., a first reserve block) corresponding thereto may be selected, and the first high reliability block and the first reserve block corresponding thereto may be selected based on various techniques. For example, the first high reliability block and the first reserve block corresponding thereto may be selected in a memory system connected to the same channel, or may be selected in one of a plurality of flash memory devices included in one channel. Alternatively, each of the flash memory devices may include a plurality of dies DIE, and the first high reliability block and the first reserve block corresponding thereto may be selected in the same die.

FIG. 12B illustrates a block selection example according to an embodiment, and for example, a first flash memory device Flash 1 is illustrated as one flash memory device connected to a first channel Ch1. The first flash memory device Flash 1 may include a plurality of dies DIE, and a first die DIE1 723_11 and a second die DIE2 723_12 among the plurality of dies are illustrated. Also, each of the first die DIE1 and the second die DIE2 may include a plurality of blocks.

A host system may issue a request to allocate a plurality of high reliability blocks to the first flash memory device Flash 1, and for example, a first high reliability block EF1 disposed in the first die DIE1 and a second high reliability block EF2 disposed in the second die DIE2 may be allocated to a meta region. In this case, one or more reserve blocks to be used in relation to a repair operation may be further allocated to the meta region, and for example, a first reserve block Rsvd1 corresponding to the first high reliability block EF1 may be selected in the first die DIE1 and a second reserve block Rsvd2 corresponding to the second high reliability block EF2 may be selected in the second die DIE2. For example, parallel communication may be performed between the controller 721 and the plurality of memory systems 723, 724, and 725, and at this time, a reserve block may be selected so that data access relevant to repairing an error of metadata does not affect data communication of another memory.

Figure 13:
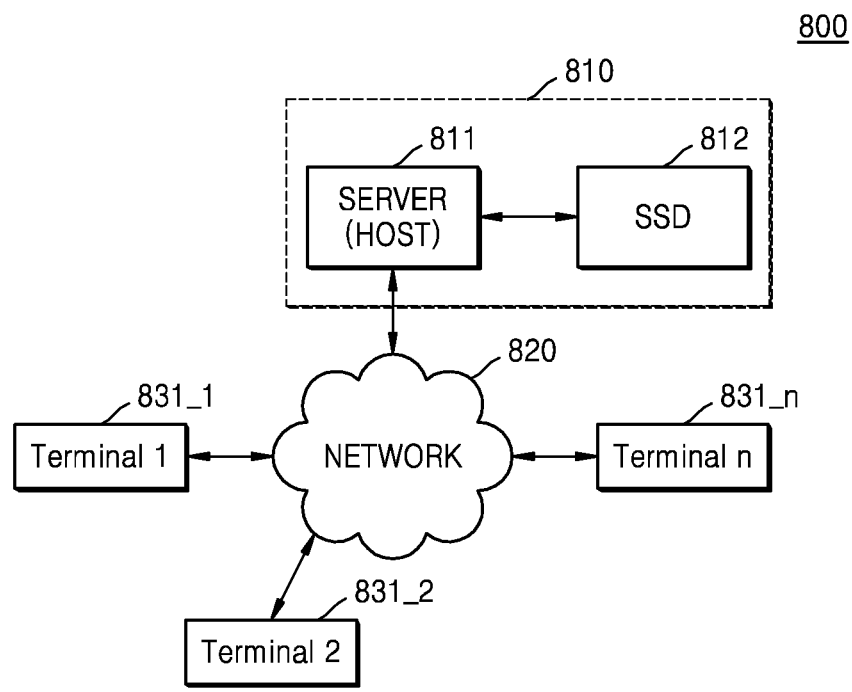
FIG. 13 is a block diagram illustrating a network system including a server system according to an embodiment.

FIG. 13 is a block diagram illustrating a network system 800 including a server system according to an embodiment. In FIG. 13, a server system and a plurality of terminals (e.g., a computing node) are illustrated, and the server system may be implemented with the data processing system according to the above-described embodiments.

Referring to FIG. 13, the network system 800 may include a server system 810 and a plurality of terminals 831_1 to 831_*n* performing communication through a network 820. The server system 810 may include a server 811 and an SSD 812 corresponding to a storage system. The server 811 may perform a function of a host system according to the above-described embodiments.

The server 811 may process requests communicated from the plurality of terminals 831_1 to 831_*n* connected to the network 820. For example, the server 811 may store data, provided from the plurality of terminals 831_1 to 831_*n*, in the SSD 812. Also, in storing data in the SSD 812, metadata may be stored in the SSD 812 so as to manage the SSD 812. According to the above-described embodiments, the server 811 may issue a request, to the SSD 812, to allocate a block for storing the metadata, and the SSD 812 may perform allocation on blocks storing the metadata and may perform a bad block determination operation and a management operation on the allocated blocks. Also, a repair operation for enhancing the reliability of the metadata may be applied.

While the inventive concept has been particularly shown and described with reference to embodiments thereof, it will be understood that various changes in form and details may be made therein without departing from the spirit and scope of the following claims.

What is claimed is:

1. A storage system including an Open-Channel Solid-State Drive (OC-SSD) and communicating with a host system, the host system external from the storage system, the storage system comprising:
   a storage device including storage medium divided into a plurality of blocks including high reliability blocks and reserve blocks; and
   a controller configured to:
      send, to the host system, block information identifying the high reliability blocks among the plurality of blocks and information indicating a plurality of repair operation techniques supported by the storage system,
      receive a block allocation request from the host system, wherein the block allocation request identifies at least one of the high reliability blocks to be allocated to a meta region where metadata is stored and includes information identifying a data mirroring technique or a repair parity technique as a selected repair operation technique, from among the plurality of repair operation techniques, selected by the host system,
      allocate the at least one of the high reliability blocks to the meta region in response to the block allocation request,
      set the selected repair operation technique, selected by the host system, as a set repair operation technique for the high reliability blocks, and
      select a different number of the reserve blocks to be allocated to the meta region based on the set repair operation technique, wherein:
   the controller comprises a bad block manager configured to manage a block allocation operation performed in response to the block allocation request, and a repair module configured to repair an error in the metadata stored in the at least one of the high reliability blocks, and
   when sudden power-off (SPO) occurs, the controller selectively accesses blocks included in the meta region and provides the metadata to the host system.

2. The storage system of claim 1, wherein:
   when one of at least one of the reserve blocks becomes exhausted, the controller is further configured to send information identifying the one of the at least one of the reserve blocks becoming exhausted to the host system, and in response to a request from the host system requesting allocation of an additional reserve block from among the reserve blocks, the controller is further configured to additionally allocate the additional reserve block to the meta region.

3. The storage system of claim 1, wherein the data mirroring technique writes the metadata stored in the at least one of the high reliability blocks to selected reserve blocks.

4. The storage system of claim 1, wherein:
the repair parity technique writes repair parity information in selected reserve blocks, and
a number of the at least one of the high reliability blocks storing metadata is greater than a number of the reserve blocks storing the repair parity information.

5. The storage system of claim 1, wherein the controller further comprises an interface circuit configured to communicate with the host system using a non-volatile memory express (NVMe) interface, such that the block information and the block allocation request are communicated via the interface circuit.

6. The storage system of claim 1, wherein the storage medium includes a plurality of flash memory devices managed by a flash translation layer operating in the host system.

7. The storage system of claim 1, wherein:
the controller further comprises a processor and a working memory accessible by the processor,
the bad block manager comprises:
a program loaded in the working memory and executed by the processor, wherein the program implements a meta region management module configured to allocate the at least one of the high reliability blocks and at least one of the reserve blocks to the meta region in response to the block allocation request; and
a bad block management module configured to manage block map information in response to a bad block determination performed on the at least one of the high reliability blocks of the meta region, and
the repair module is configured to perform a repair operation on the metadata stored in the at least one of the high reliability blocks using information stored in selected reserve blocks.

8. The storage system of claim 1, wherein the OC-SSD is configured to receive a physical address indicating a location at which the metadata is accessed by the host system.

9. The storage system of claim 1, when a first repair operation technique is selected from among the plurality of repair operation techniques by the host system, one reserve block is allocated corresponding to one high reliability block.

10. The storage system of claim 9, wherein:
when a second repair operation technique is selected from among the plurality of repair operation techniques by the host system, one reserve block is allocated corresponding to at least two high reliability blocks, and
the second repair operation technique has a lower correction capability than the first repair operation technique.

11. The storage system of claim 1, wherein the block allocation request identifies the number of reserve blocks from among the plurality of blocks used during a repair operation performed on the metadata stored in the number of the high reliability blocks.

12. The storage system of claim 1, wherein the block allocation request identifies the number of the high reliability blocks to be used to store the metadata.

13. An operating method of a storage system including an Open-Channel Solid-State Drive (OC-SSD) having a plurality of blocks, the plurality of blocks including high reliability blocks and reserve blocks, the operating method comprising:
sending block information to a host system identifying a number of the high reliability blocks among the plurality of blocks and information indicating a plurality of repair operation techniques supported by the storage system, the host system external of the storage system;
receiving from the host system, a block allocation request identifying a high reliability block among the high reliability blocks to be allocated to a meta region where metadata is stored based on the block information sent by the storage system and a reserve block from among the reserve blocks corresponding to the high reliability block, the block allocation request further including information identifying a data mirroring technique or a repair parity technique as a selected repair operation technique, from among the plurality of repair operation techniques, selected by the host system;
allocating the high reliability block to the meta region in response to the block allocation request;
allocating the reserve block to the meta region in response to the block allocation request;
setting the selected repair operation technique, selected by the host system, as a set repair operation technique for the high reliability blocks;
selecting a different number of the reserve blocks to be allocated to the meta region based on the set repair operation technique;
writing metadata to the high reliability block in response to a metadata writing request received from the host system;
determining whether the high reliability block is a bad block;
upon determining that the high reliability block is a bad block, communicating to the host system that the high reliability block is a bad block and repairing the metadata written in the high reliability block; and
selectively accessing, when sudden power-off (SPO) occurs, the meta region and providing the metadata to the host system.

14. The operating method of claim 13, further comprising:
writing the metadata to selected reserve blocks to mirror the metadata written to the high reliability block responsive to the information indicating the data mirroring technique, wherein
the repairing of the metadata stored in the high reliability block uses the metadata written to the selected reserve blocks.

15. The operating method of claim 13, further comprising:
generating repair parity information from the metadata written in the high reliability block and storing the repair parity information in selected reserve blocks responsive to the information indicating the repair parity technique, wherein
the repairing of the metadata written in the high reliability block uses the repair parity information stored to the selected reserve blocks.

16. The operating method of claim 13, further comprising:
determining whether the reserve block has become exhausted; and
upon determining that the reserve block has become exhausted, communicating information to the host system identifying the reserve block as an exhausted reserve block.

17. The operating method of claim 13, wherein the block allocation request further identifies:
   the number of reserve blocks from among the plurality of blocks used during a repair operation performed on the metadata stored in the number of the high reliability blocks, and
   the number of the high reliability blocks to be used to store the metadata.

18. A host system communicating with a storage system including an Open-Channel Solid-State Drive (OC-SSD) having a controller and a plurality of blocks, the host system external of the storage system, the host system comprising:
   a host flash translation layer (FTL) that manages the plurality of blocks, wherein the host FTL comprises a request generating module that generates a block allocation request for allocating at least one of high reliability blocks among the plurality of blocks to be used to store metadata; and
   an interface circuit configured to interface with the storage system to receive block information identifying the high reliability blocks and information indicating a plurality of repair operation techniques supported by the storage system during an initialization operation of the storage system and send the block allocation request from the host system to the storage system, wherein the block allocation request includes information identifying a number of the high reliability blocks to be allocated to a meta region where the metadata is stored, a corresponding address location for each of the number of the high reliability blocks, and information identifying a data mirroring technique or a repair parity technique as a selected repair operation technique, from among the plurality of repair operation techniques, selected by the host system, wherein:
   a different number of reserve blocks from among the plurality of blocks to be allocated to the meta region of the storage system are selected based on the selected repair operation technique, and
   when sudden power-off (SPO) occurs, receiving the metadata that a controller has selectively accessed within the meta region.

19. The host system of claim 18, wherein the block allocation request further comprises information identifying the number of reserve blocks from among the plurality of blocks used during a repair operation performed on the metadata stored in the number of the high reliability blocks.

20. The host system of claim 18, wherein when power is applied to the host system following a power-off, the host system is configured to access the at least one of the high reliability blocks storing the metadata.

* * * * *